United States Patent
Togashi

(10) Patent No.: US 8,947,850 B2
(45) Date of Patent: Feb. 3, 2015

(54) MULTILAYER CAPACITOR

(75) Inventor: Masaaki Togashi, Tokyo (JP)

(73) Assignee: TDK Corporation, Tokyo (JP)

( * ) Notice: Subject to any disclaimer, the term of this patent is extended or adjusted under 35 U.S.C. 154(b) by 62 days.

(21) Appl. No.: 13/546,729

(22) Filed: Jul. 11, 2012

(65) Prior Publication Data

US 2013/0038979 A1    Feb. 14, 2013

(30) Foreign Application Priority Data

Aug. 10, 2011    (JP) .................. 2011-175133

(51) Int. Cl.
  *H01G 4/30*    (2006.01)
  *H01G 4/015*   (2006.01)
  *H01G 2/22*    (2006.01)
  *H01G 2/24*    (2006.01)

(52) U.S. Cl.
  CPC ............ *H01G 4/30* (2013.01); *H01G 4/015* (2013.01); *H01G 2/22* (2013.01); *H01G 2/24* (2013.01)
  USPC .................... 361/301.4; 361/301.3

(58) Field of Classification Search
  None
  See application file for complete search history.

(56) References Cited

U.S. PATENT DOCUMENTS

2004/0183147 A1    9/2004    Togashi et al.

FOREIGN PATENT DOCUMENTS

| JP | 9-340083   | 12/1999 |
| JP | 9-340106   | 12/1999 |
| JP | 2000-243657 | 9/2000 |
| JP | A-2004-335963 | 11/2004 |
| JP | A-2007-258476 | 10/2007 |
| JP | 9-071106   | 4/2009 |
| JP | A-2011-18758 | 1/2011 |

*Primary Examiner* — Dion R Ferguson
(74) *Attorney, Agent, or Firm* — Oliff PLC

(57) ABSTRACT

A multilayer capacitor that can suppress electrostrictive vibration without material constraint and with applicability to various structures, including general-purpose structures. A multilayer capacitor has: an element body formed of dielectric ceramic; and a plurality of internal electrodes disposed inside the element body such that the internal electrodes are stacked with ceramic layers sandwiched therebetween. The multilayer capacitor is provided with a capacitor area which includes the plurality of internal electrodes and a first suppression area and a second suppression area for reducing electrostriction caused by the plurality of internal electrodes so as to suppress noise. The first suppression area is adjacent to the capacitor area and the thickness of the second suppression area is determined according to the arrangement of the plurality of internal electrodes.

10 Claims, 12 Drawing Sheets

Fig.1
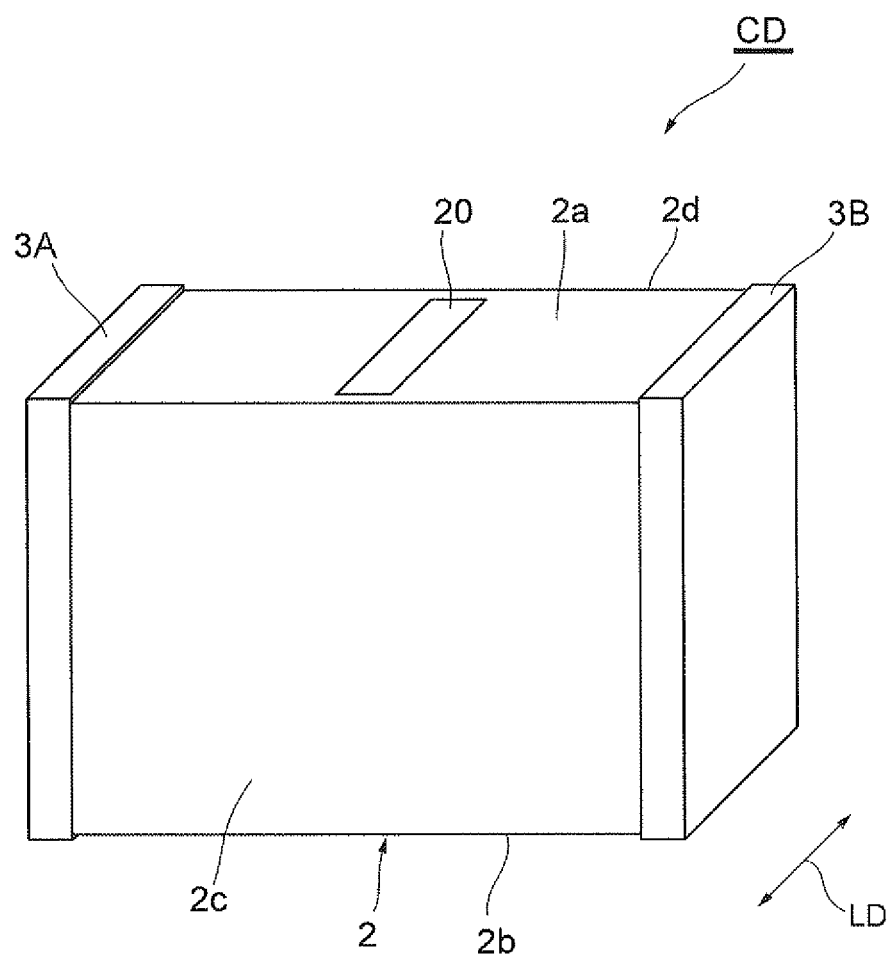
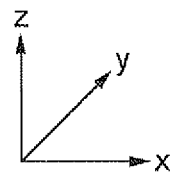

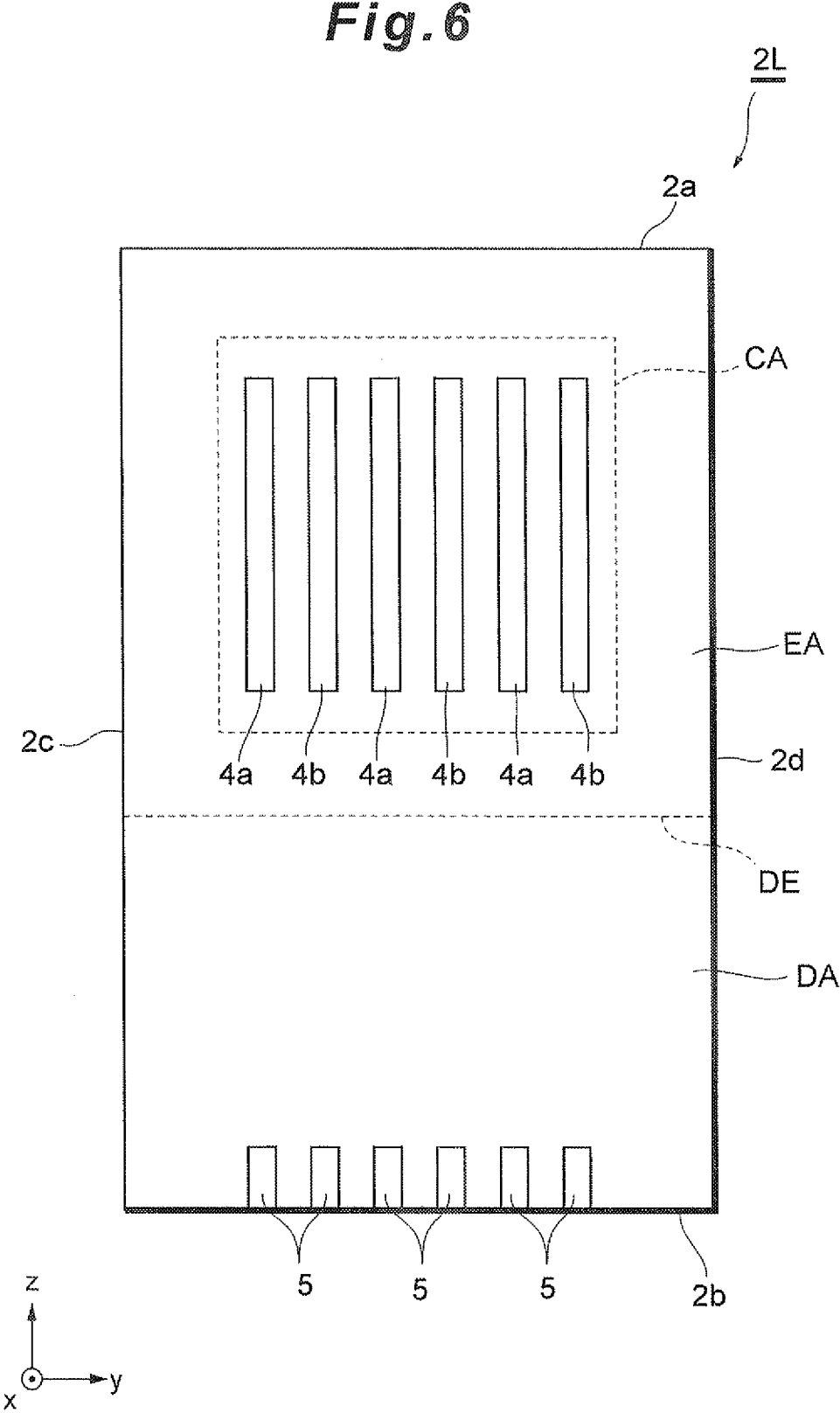

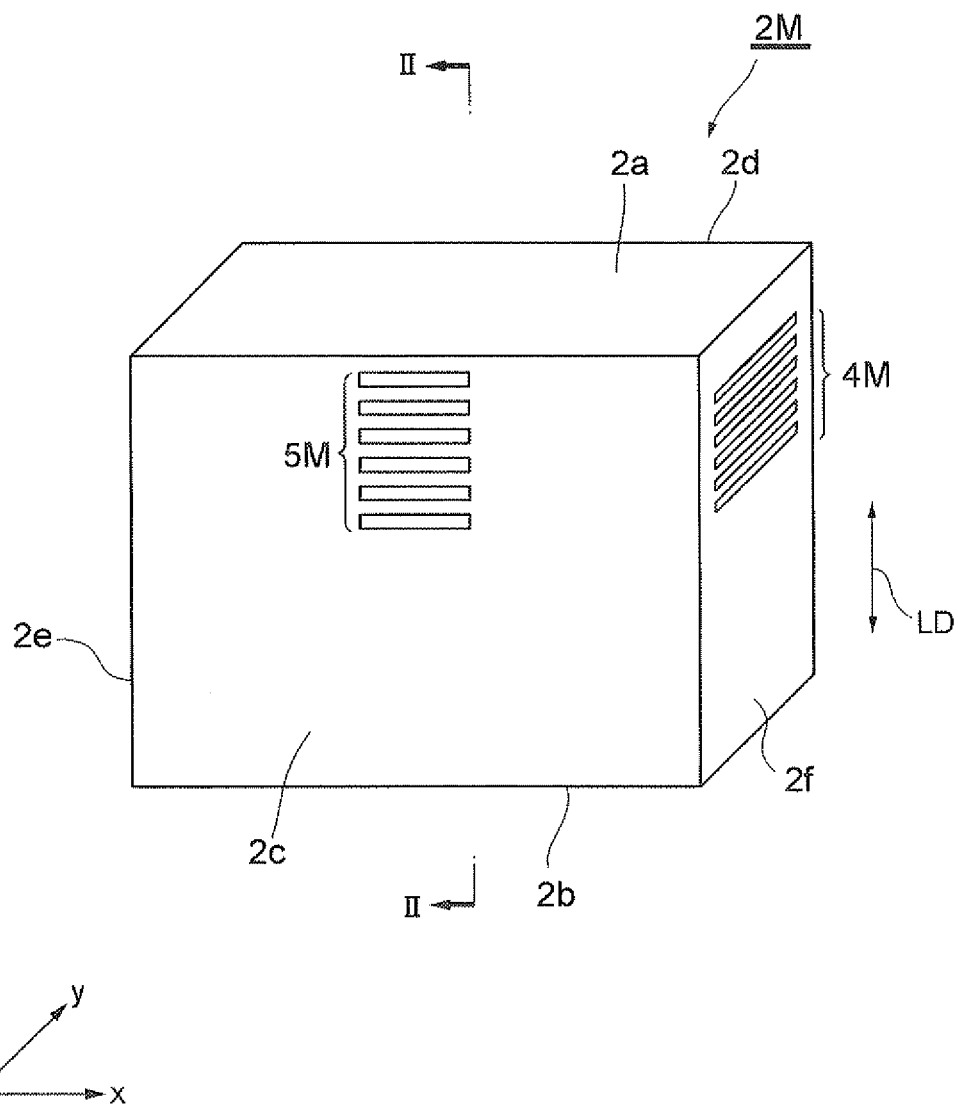

MULTILAYER CAPACITOR

CROSS-REFERENCES TO RELATED APPLICATIONS

The present application relates to and claims priority from Japanese Patent Application No. 2011-175133, filed on Aug. 10, 2011, the entire disclosure of which is incorporated herein by reference.

BACKGROUND

1. Field of the Invention

The present invention relates to a multilayer capacitor.

2. Description of Related Art

Multilayer capacitors are one example of multilayer electronic components and are widely used as electronic components having small sizes, high capacity and high reliability. Electric and electronic devices have a large number of multilayer capacitors used therein. As devices have been becoming smaller in size and achieving higher performance in recent years, further improvement of multilayer capacitors in terms of small size, high capacity, low cost and high reliability is even more strongly demanded.

Ferroelectric ceramic material is typically used for currently available small-size and high-capacity multilayer capacitors. When an electric field is applied to such ferroelectric ceramic material, mechanical distortion, namely, electrostriction, occurs in the material. Accordingly, when electric voltage is applied to a multilayer capacitor made of ferroelectric ceramic material, the capacitor vibrates due to electrostriction.

In the case where a multilayer capacitor is mounted onto a circuit board, such electrostrictive vibration of the multilayer capacitor may be transmitted to the board, and not only the multilayer capacitor itself but the board and the peripheral components may vibrate, which may emit vibration sounds of audible frequency (20-20,000 Hz). Some vibration sounds are in a frequency range which is uncomfortable for humans, and solutions for such vibration sounds are demanded.

In order to prevent the multilayer capacitor vibration due to electrostriction from being transmitted to the board, Japanese Unexamined Patent Publication No, 2004-335963 (Patent Document 1) proposes providing the multilayer capacitor with electrode connection parts for connecting external terminal electrodes to the board to make a certain separation between the board and the undersurface of the capacitor's main body.

However, when adopting the method of making a certain separation between the board and the capacitor's main body using the electrode connection parts, such addition of the electrode connection parts may increase the manufacturing cost or complicate the manufacturing processes, so further improvement is required.

Meanwhile, in Japanese Unexamined Patent Publication No. 2007-258476 (Patent Document 2), the dielectric layer that constitutes a multilayer capacitor is formed of a dielectric ceramic composition that contains, as major components thereof, $BaTiO_3$, $SrTiO_3$ and $CaTiO_3$, wherein these components do not substantially form a solid solution but instead form a composite structure. In Patent Document 2, an electrode paste film, which will be an internal electrode layer after being fired, is formed with electrode paste that includes conductive powder and a common material containing $BaTiO_3$ powder, $SrTiO_3$ powder and $CaTiO_3$ powder wherein the content of the $BaTiO_3$ powder is in a specific range.

In contrast to the material approach used in Patent Document 2, Japanese Unexamined Patent Publication No. 2011-018758 (Patent Document 3) proposes a solution through a structural approach. Specifically, Patent Document 3 discloses that a first internal electrode electrically connected to a first terminal electrode, a second internal electrode electrically connected to a second terminal electrode and a third internal electrode electrically isolated from the first and second terminal electrodes are disposed such that a dielectric layer is sandwiched by the first and third internal electrodes and also sandwiched by the second and third internal electrodes, thereby achieving a configuration of two capacitive components being serially connected. In this configuration, the third internal electrode has a narrow-width portion in an area where no capacitive component is formed, the narrow-width portion having a width smaller than that of an active portion in which the third internal electrode faces the first internal electrode and the second internal electrode. An opening is formed with this narrow-width portion so that the portion where no electrode is formed in the center thereof has a larger area, and as a result, the dielectric layers can be fixed with strong adhesion to each other when the element body is fired.

Patent Document 1: Japanese Unexamined Patent Publication No. 2004-335963

Patent Document 2: Japanese Unexamined Patent Publication No. 2007-258476

Patent Document 3: Japanese Unexamined Patent Publication No. 2011-018758

SUMMARY

Since electrostrictive vibration inherently arises from forming the multilayer capacitor using ferroelectric ceramic material, preventing electrostrictive vibration through a material approach, as described in Patent Document 2, can be one effective solution. However, such material approach would restrict the materials applied to constitute the multilayer capacitor, thereby making it difficult to enhance the performance of the capacitor itself using various other materials.

In contrast to the material approach, the structural approach described in Patent Document 3 does not restrict the materials used to constitute the multilayer capacitor. However, having a configuration including a third internal electrode, as described above, is unavoidable, and this would be a structural constraint. Due to such structural constraint, the structural approach does not work effectively to suppress electrostrictive vibration of multilayer capacitors having general-purpose structures.

The invention has been made in view of the above-described problems, and an object of the invention is to provide a multilayer capacitor that can suppress electrostrictive vibration without material constraint and with applicability to various structures, including general-purpose structures.

In order to solve the above problems, the invention provides a multilayer capacitor that comprises: an element body formed of dielectric ceramic; a plurality of internal electrodes disposed inside the element body such that the internal electrodes are stacked with ceramic layers sandwiched therebetween; and a pair of terminal electrodes provided on an outer surface of the element body and connected to the internal electrodes, wherein a capacitor area, which includes the plurality of internal electrodes, and a suppression area, for reducing electrostriction caused by the plurality of internal electrodes to suppress noise, are formed. At least part of the suppression area is adjacent to the capacitor area, and a thickness of the suppression area is determined according to the arrangement of the plurality of internal electrodes, the thickness being determined to satisfy the following expressions:

$$\alpha/\beta \leq 650;$$

$$\alpha = We^* n/d \text{ (}We\text{: electrode width, }n\text{: number of stacked electrodes, }d\text{: inter-electrode distance); and}$$

$$\beta = T/W \text{ (}T\text{: suppression area thickness, }W\text{: element body width).}$$

According to the invention, since the suppression area is formed adjacent to the capacitor area, electrostriction occurring due to the internal electrodes included in the capacitor area can be reduced and noise can consequently be suppressed. Further, since at least part of the suppression area is adjacent to the capacitor area and since the thickness of the suppression area, which is a factor ensuring the ability of the suppression area to reduce electrostriction, is determined according to the arrangement of the internal electrodes, the suppression area can be formed depending on a given design of the capacitor area. Accordingly, the multilayer capacitor can effectively suppress electrostrictive vibration, with the suppression area applicable even in the case where a capacitor area of a given general-purpose design is included, and without constraint on its constituent material.

The multilayer capacitor according to the invention preferably has a marking provided on the outer surface of the element body to indicate the position of the capacitor area relative to the element body.

With this preferable configuration, since the marking that indicates the position of the capacitor area relative to the element body is provided on the outer surface of the element body, the capacitor area position can be identified with accuracy. Accordingly, an arrangement which does not easily transmit electrostrictive vibration can be selected according to the relationship between the suppression area and the capacitor area.

In the multilayer capacitor according to the invention, it is also preferable that the marking is formed by wiring (extending) out a marking internal electrode to the outer surface at a portion where the paired terminal electrodes are not formed.

With this preferable configuration, since the marking is formed by wiring out the marking internal electrode, the multilayer capacitor can be identified, for example, as a vertical electrode type if the marking is formed on the top and/or bottom face of the element body, and as a horizontal electrode type if the marking is formed on the side face of the element body. Accordingly, the configuration of the capacitor area can be understood more accurately, and an arrangement which does not easily transmit electrostrictive vibration can be selected.

In the multilayer capacitor according to the invention, it is also preferable that the element body is configured such that its height size is greater than its width size.

With this preferable configuration, since the height size of the element body is greater than its width size, an area of sufficient thickness can be ensured on the mounting surface side when seen from the capacitor area. Accordingly, the suppression area can be disposed on the mounting surface side relative to the capacitor area, which can further ensure that the transmission of electrostrictive vibration to the mounting surface side is suppressed.

In the multilayer capacitor according to the invention, it is also preferable that the marking internal electrode is wired out to only one side face of the outer surface and that the marking is formed on only the one side face.

With this preferable configuration, since the marking is formed on only one side face, the stacking direction of the internal electrodes and the mounting direction can be understood from the relative positions with respect to the one side face.

In the multilayer capacitor according to the invention, it is also preferable that: the element body is configured such that the height size is greater than the width size; the suppression area includes a first area that surrounds the capacitor area and a second area adjacent to only one side of the first area; and the marking internal electrode is wired out to only one surface of the outer surface, at a portion in the second area or at a portion opposite to the second area when seen from the capacitor area.

With this preferable configuration, since the marking internal electrode is wired out to the outer surface of the element body only at a portion in the second area or at a portion opposite to the second area when seen from the capacitor area and the marking is formed on that outer surface, the multilayer capacitor can be identified as having a structure in which the internal electrodes are vertically arranged. Further, the second area, which is provided on the principal surface side of the multilayer body opposite to the surface where the marking is formed, can be accurately arranged on the mounting surface side, and this further ensures that the transmission of electrostrictive vibration caused by the capacitor area to the mounting surface side is suppressed.

In the multilayer capacitor according to the invention, it is also preferable that the suppression area is composed of a ceramic portion and plate-like vibration suppression internal electrodes made of metal, the vibration suppression internal electrodes being covered by the ceramic portion, wherein a thickness of the suppression area that is adjacent to the capacitor area is determined according to the arrangement of the vibration suppression internal electrodes, to satisfy the following expressions:

$$\alpha/\beta' \leq 650;$$

$$\alpha = We^* n/d \text{ (}We\text{: electrode width, }n\text{: number of stacked electrodes, }d\text{: inter-electrode distance); and}$$

$$\beta' = T/W^* p \text{ (}p\text{: vibration suppression internal electrode contribution factor, }T\text{: suppression area thickness, }W\text{: element body width).}$$

With this preferable configuration, when determining the thickness of the suppression area, the level of contribution of the vibration suppression internal electrodes to the suppression of electrostrictive vibration is taken into consideration as a vibration suppression internal electrode contribution factor. Accordingly, electrostrictive vibration can be suppressed in a more suitable manner.

In the multilayer capacitor according to the invention, it is also preferable that the suppression area includes a first area that surrounds the capacitor area and a second area adjacent to the first area and that the vibration suppression internal electrodes are formed in the first area, outside the internal electrodes.

With this preferable configuration, the vibration suppression internal electrodes are formed in the first area that surrounds the capacitor area, and can suppress the vibration in the first area which is in close proximity to the capacitor area, i.e., the source of electrostrictive vibration.

In the multilayer capacitor according to the invention, it is also preferable that the suppression area includes a first area that surrounds the capacitor area and a second area adjacent to the first area and that the vibration suppression internal electrodes are formed in the second area such that the vibration suppression internal electrodes are stacked in the same direction as the internal electrodes.

With this preferable configuration, since the vibration suppression internal electrodes are formed in the second area that is adjacent to the first area surrounding the capacitor area, by stacking them in the same direction as the internal electrodes, the vibration suppression internal electrodes can be formed in the same processes as those of the other internal electrodes.

In the multilayer capacitor according to the invention, it is also preferable that the second area is formed such that the second area is adjacent to only one side of the first area.

With this preferable configuration, since the second area is formed so as to be adjacent to only one side of the first area, the effect of suppressing electrostrictive vibration can be focused on the one side.

In the multilayer capacitor according to the invention, it is also preferable that at least one pair of the vibration suppression internal electrodes is formed in the same plane and that the paired vibration suppression internal electrodes are connected respectively to the terminal electrodes having opposite polarity to each other.

With this preferable configuration, the direction of electrostrictive vibration caused by the paired vibration suppression internal electrodes and the direction of electrostrictive vibration caused by the internal electrodes serving as the main electrodes intersect with each other, allowing further reduction of electrostrictive vibration.

The invention can provide a multilayer capacitor that can suppress electrostrictive vibration without material constraint and with applicability to various structures, including general-purpose structures.

BRIEF DESCRIPTION OF THE DRAWINGS

FIG. 1 is a perspective view schematically illustrating the appearance of a multilayer capacitor according to a first embodiment of the invention.

FIG. 6 is a cross-sectional view of the modification shown in FIGS. 5A and 5B along the same line as in FIG. 4.

FIG. 8 is a perspective view of the multilayer capacitor shown in FIG. 7, from which terminal electrodes have been removed.

DETAILED DESCRIPTION OF PREFERRED EMBODIMENTS

Figure 2:
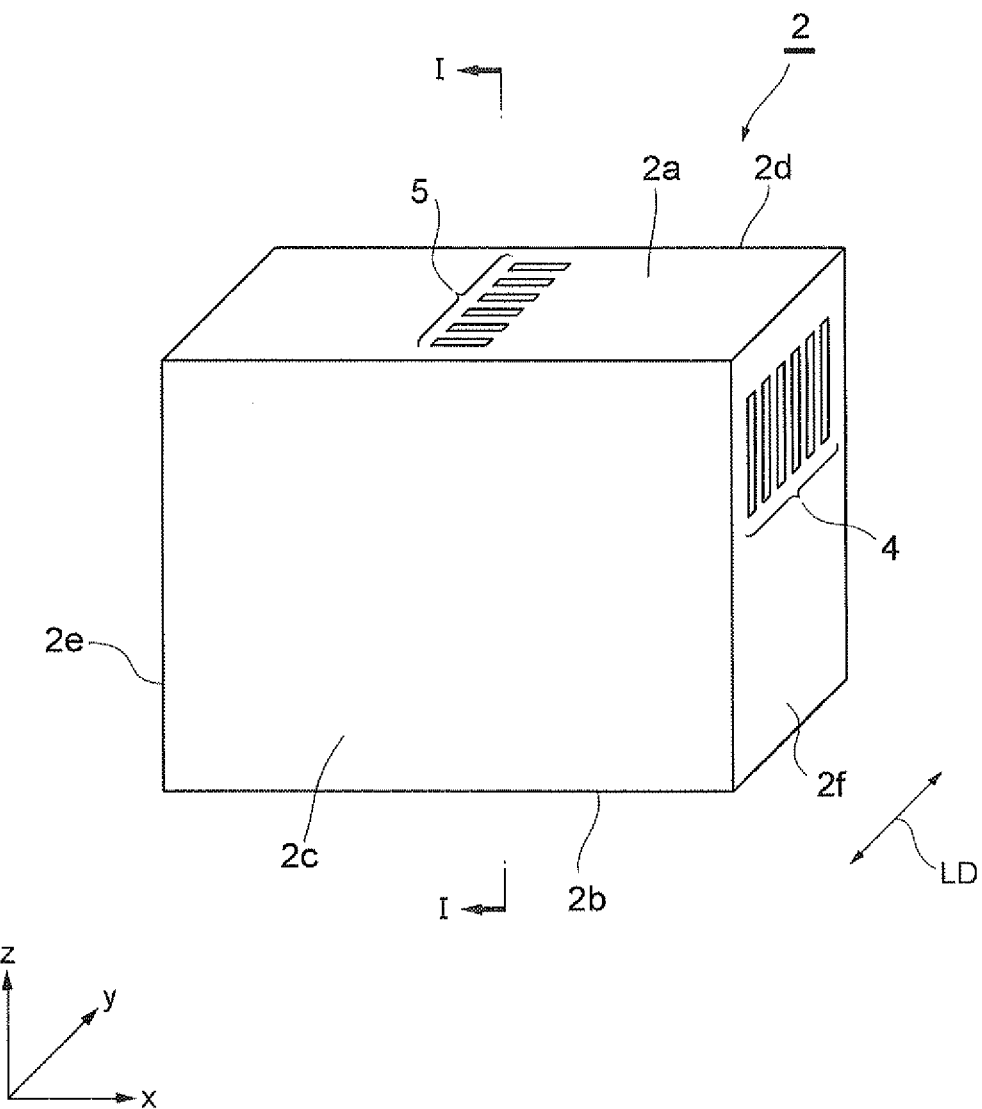
FIG. 2 is a perspective view of the multilayer capacitor shown in FIG. 1, from which terminal electrodes have been removed.

Embodiments of the invention will be described below with reference to the attached drawings. In the drawings, in order to facilitate understanding of the description, the same components are given the same reference numerals wherever possible, and repetitive descriptions will be omitted.

Referring to FIG. 1, a multilayer capacitor according to a first embodiment of the invention will be described. FIG. 1 is a perspective view schematically illustrating the appearance of a multilayer capacitor CD according to the first embodiment of the invention.

The multilayer capacitor CD has a multilayer body 2 and a pair of terminal electrodes 3A and 3B. The multilayer body 2 is in an approximately rectangular parallelepiped shape and has a first principal surface 2a, a second principal surface 2b, a first side face 2c, a second side face 2d, a first end face 2e (not specified in FIG. 1) and a second end face 2f (not specified in FIG. 1).

The second principal surface 2b is an outer face corresponding to the back side of the first principal surface 2a. The second side face 2d is an outer face corresponding to the back side of the first side face 2c. The first side face 2c and the second side face 2d are outer faces connecting the first principal surface 2a and the second principal surface 2b. The first side face 2c connects one side of the first principal surface 2a and one side of the second principal surface 2b, and the second side face 2d connects the opposite side of the first principal surface 2a and the opposite side of the second principal surface 2b.

When focusing on the first and second principal surfaces 2a and 2b and the first and second side faces 2c and 2d, they form a rectangular tube. The first end face 2e (not specified in FIG. 1) (see FIG. 2) is disposed at one end of the rectangular tube which corresponds to the bottom of the tube, and the second end face 2f (not specified in FIG. 1) (see FIG. 2) is disposed at the other end of the rectangular tube so as to face the first end face 2e.

In other words, the multilayer body 2 has an approximately rectangular parallelepiped shape having outer surfaces of: mutually facing first and second principal surfaces 2a and 2b; mutually facing first and second side faces 2c and 2d; and mutually facing first and second end faces 2e and 2f. The first end face 2e and the second end face 2f extend in the short side direction of the first and second principal surfaces 2a and 2b so as to connect the first and second principal surfaces 2a and 2b. The first side face 2c and the second side face 2d extend in the long side direction of the first and second principal surfaces 2a and 2b so as to connect the first and second principal surfaces 2a and 2b.

The terminal electrodes 3A and 3B are formed on the outer surface of the multilayer body 2. More specifically, the terminal electrode 3A is formed on the first end face 2e of the multilayer body 2 and extends to the first principal surface 2a, second principal surface 2b, first side face 2c and second side face 2d to cover the four sides of the first end face 2e, such that the electrode terminal 3A is physically and electrically connected so as to cover internal electrodes 4a which are exposed on the first end face 2e. The terminal electrode 3B is formed on the second end face 2f of the multilayer body 2 and extends to the first principal surface 2a, second principal surface 2b, first side face 2c and second side face 2d to cover the four sides of the second end face 2f, such that the electrode terminal 3B is physically and electrically connected so as to cover internal electrodes 4b which are exposed on the second end face 2f. In this embodiment, the height size of the multilayer body 2 in the substantially perpendicular direction (z-direction) relative to the principal surfaces 2a and 2b is greater than the width size in the short side direction (y-direction) of the principal surfaces 2a and 2b.

In FIG. 1, mutually orthogonal x-, y-, and z-axes are given for convenience in description. The x-axis is given for a direction extending from the terminal electrode 3A to the terminal electrode 3B. The y-axis is given for a direction extending from the first side face 2c to the second side face 2d. The z-axis is given for a direction extending from the second principal surface 2b to the first principal surface 2a. The remaining drawings also have the x-, y-, and z-axes given in the same manner.

FIG. 2 illustrates the multilayer capacitor CD from which the terminal electrodes 3A and 3B have been removed. As illustrated in FIG. 2, the multilayer body 2 has the first principal surface 2a, the second principal surface 2b, the first side face 2c, the second side face 2d, the first end face 2e and the second end face 2f.

The multilayer body 2 has a plurality of internal electrodes 4. The multilayer body 2 also has marking internal electrodes 5. The multilayer body 2 is formed by stacking multiple ceramic green sheets, each having an internal electrode 4 and a marking internal electrode 5 formed therein, in a stacking direction LD and firing the stacked sheets.

Figure 3A:
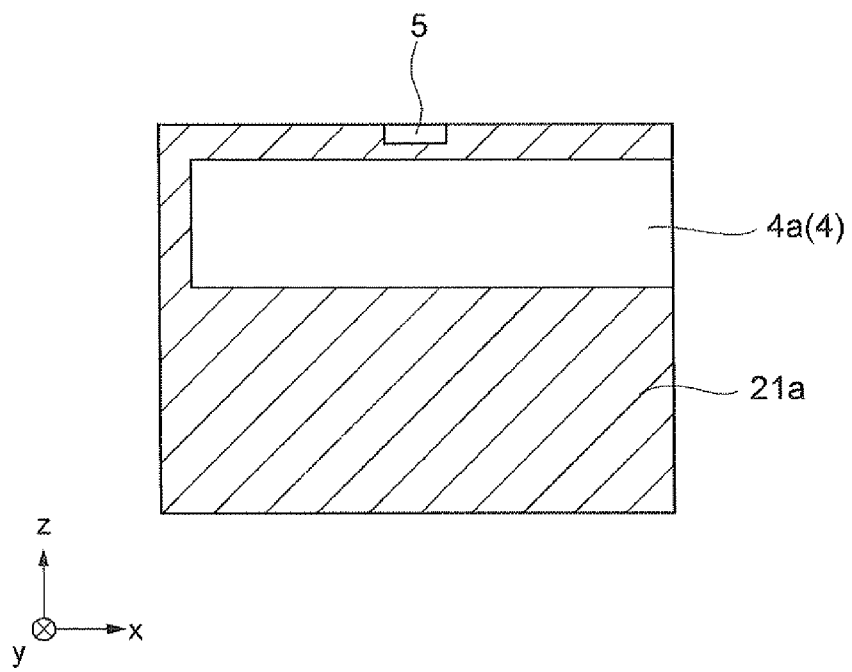
FIGS. 3A and 3B are illustrations showing the state of internal electrodes of the multilayer capacitor shown in FIG. 1.
Figure 3B:
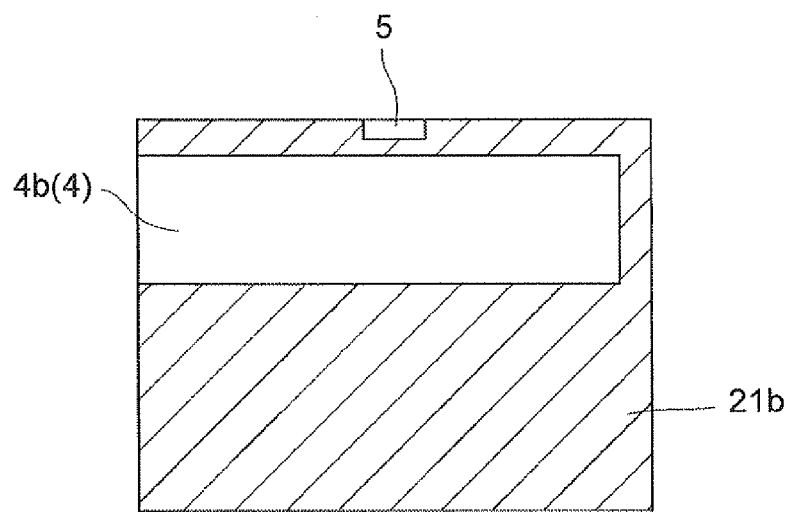

FIGS. 3A and 3B show the arrangement of the internal electrodes 4 and the marking internal electrodes 5 in the multilayer body 2. FIG. 3A illustrates a layer in which an internal electrode 4a(4), to be connected to the terminal electrode 3A, is formed, and FIG. 3B illustrates a layer in which an internal electrode 4b(4), to be connected to the terminal electrode 3B, is formed.

As shown in FIG. 3A, a ceramic layer 21a has an internal electrode 4a(4) and a marking internal electrode 5 formed therein, and, as shown in FIG. 3B, a ceramic layer 21b has an internal electrode 4b(4) and a marking internal electrode 5 formed therein. The multilayer body 2 is formed by alternately stacking the ceramic layers 21a and 21b.

Ceramic green sheets, which will be fired and formed into the ceramic layers 21a and 21b, are dielectric ceramic green sheets and have a thickness of, for example, around 10-35 μm. The internal electrodes 4 and the marking internal electrodes 5 are formed, for example, through screen-printing onto the ceramic green sheets with conductive paste which contains, as a major component thereof, silver or nickel.

In the multilayer body 2 formed by alternately stacking the ceramic layers 21a and 21b (see FIG. 2), the terminal electrode 3b is formed so as to be connected to the internal electrodes 4a (see FIG. 3A) and the terminal electrode 3A is formed so as to be connected to the internal electrodes 4b (see FIG. 3B). The terminal electrodes 3A and 3B are formed, for example, through an immersion method such as dipping, a printing method such as screen-printing, or through both an immersion method and a printing method, with conductive paste which contains, as a major component thereof, silver, copper or nickel.

Further, a marking 20 (see FIG. 1) is formed on the first principal surface 2a through plating so as to be connected to the marking internal electrodes 5 (see FIGS. 2, 3A and 3B). The marking 20 is formed so as to identify the top and bottom of the multilayer capacitor CD, which has vertical (z-direction) directivity.

In the multilayer capacitor CD of this embodiment, the internal electrodes 4 are disposed closer to the first principal surface 2a than to the second principal surface 2b, and by treating the second principal surface 2b as a mounting surface through which the multilayer capacitor CD is to be mounted onto a mounting target surface of a circuit board, the multilayer capacitor CD can be configured such that the internal electrodes 4 are distant from the mounting surface and electrostrictive vibration occurring in the internal electrodes 4 diminishes before it is transmitted to the circuit board. The marking 20 is utilized to properly mount the multilayer capacitor CD having such directivity.

Figure 4:
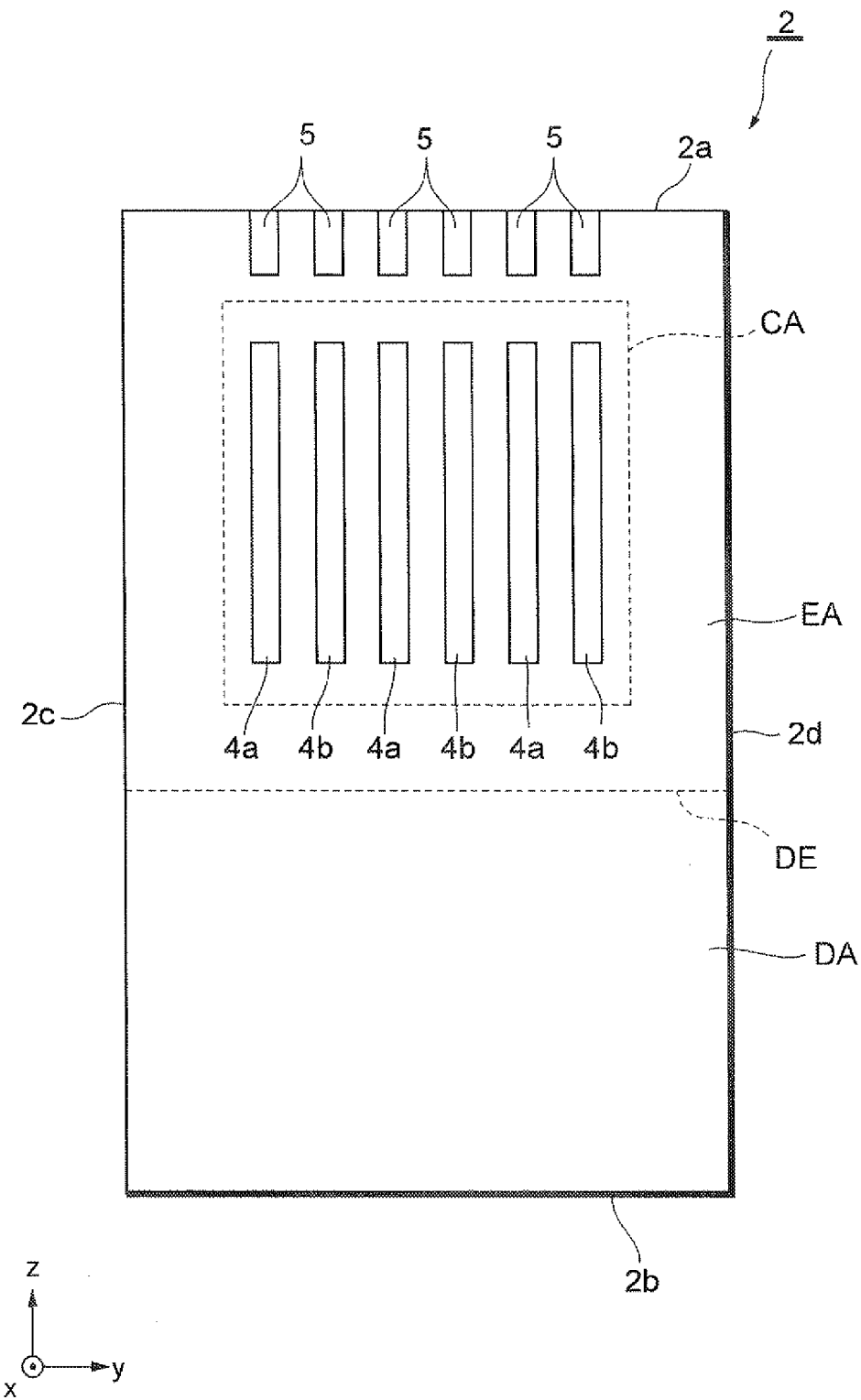
FIG. 4 is a cross-sectional view of the multilayer capacitor shown in FIG. 2 along the line I-I.

Referring next to FIG. 4, a configuration for diminishing the electrostrictive vibration occurring in the internal electrodes 4 will be described. FIG. 4 is a cross-sectional view of FIG. 2 along the line I-I. As illustrated in FIG. 4, the multilayer body 2 has a capacitor area CA which includes the internal electrodes 4a and 4b, a first suppression area EA (first area, suppression area), and a second suppression area DA (second area, suppression area).

The multilayer body 2 is configured such that the element body thereof has a height size greater than its width size. The suppression area is configured to include the first suppression area EA that surrounds the capacitor area CA and the second suppression area DA that is adjacent to only one side DE of the first suppression area EA.

In this embodiment, the marking internal electrodes 5 are wired out only to the first principal surface 2a, which is on the side opposite to the second suppression area DA when seen from the capacitor area CA. Since the marking internal electrodes 5 are wired out to the first principal surface 2a of the multilayer body 2 (element body), only on the side opposite to the second suppression area DA when seen from the capacitor area CA, thereby forming a marking, the longitudinal direction of the vertically-long element body, the height of which is greater than its width size, can be identified. Accordingly, it is possible to ensure that the second suppression area DA is arranged on the mounting surface side and that the transmission of electrostrictive vibration occurring in the capacitor area CA toward the mounting surface side can be suppressed. Since the marking internal electrodes 5 are formed on the first principal surface 2a side, one can understand, even after the terminal electrodes 3A and 3B have been formed, that the second suppression area DA is formed on the second principal surface 2b side of the multilayer body which is opposite to the first principal surface 2a, which is acting as a marking surface, and that the second principal surface 2b should be treated as a mounting surface.

In another preferable configuration, the marking internal electrodes 5 are wired out to the second suppression area DA side. An example of wiring out the marking internal electrodes 5 to the second suppression area DA side will be described below with reference to FIGS. 5A, 5B and 6.

Figure 5A:
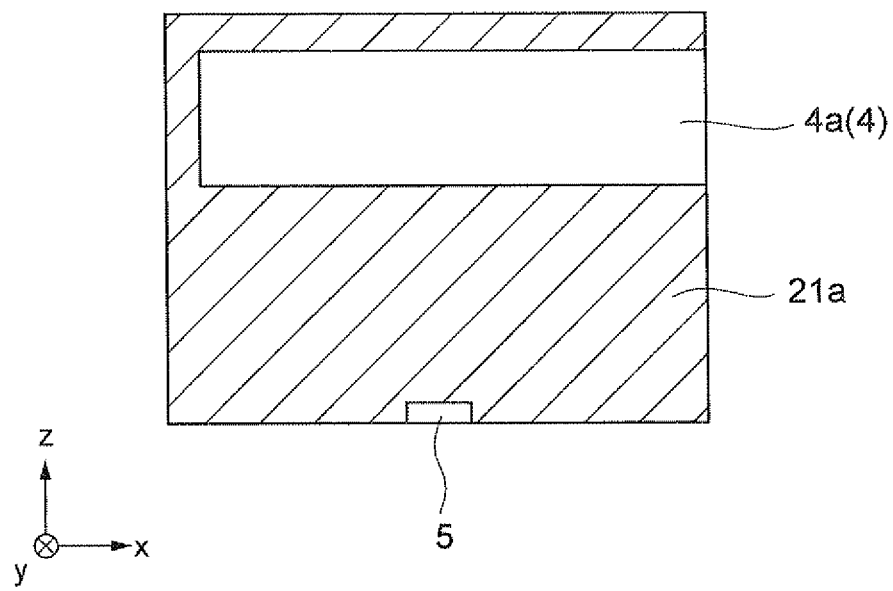
FIGS. 5A and 5B are illustrations showing a modification of FIGS. 3A and 3B.
Figure 5B:
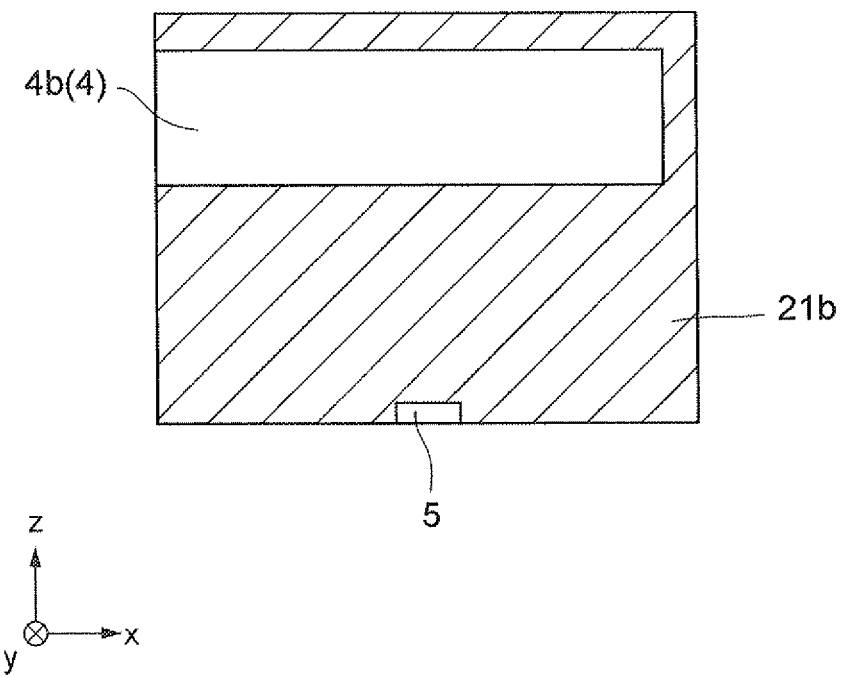

FIGS. 5A and 5B illustrate the arrangement of the internal electrodes 4 and marking internal electrodes 5 in a multilayer body 2L in which the marking internal electrodes 5 are wired out to the second suppression area DA side. FIG. 5A shows a layer in which an internal electrode 4a(4), to be connected to the terminal electrode 3B, is formed, and FIG. 5B shows a layer in which an internal electrode 4b(4), to be connected to the terminal electrode 3A, is formed, FIG. 6 is a cross-sectional view of FIG. 2 along the line I-I, and shows a cross-section of the multilayer body 2L in which the marking internal electrodes 5 are wired out to the second suppression area DA side.

As shown in FIGS. 5A, 5B and 6, since the marking internal electrodes 5 are wired out to the second principal surface 2b of the multilayer body 2L (element body), only on the second suppression area DA side, and a marking is formed on the second principal surface 2b, the longitudinal direction of the vertically-long element body, the height size of which is greater than its width size, can be identified. Accordingly, it is possible to ensure that the second suppression area DA is arranged on the mounting surface side and that the transmission of electrostrictive vibration occurring in the capacitor area CA toward the mounting surface side can be suppressed. Since the marking internal electrodes 5 are formed on the second principal surface 2b side, one can understand, even after the terminal electrodes 3A and 3B have been formed, that the second suppression area DA is formed close to the second principal surface 2b, serving as a marking surface of the multilayer body, and that the second principal surface 2b should be treated as a mounting surface.

As described above, the multilayer capacitor CD according to this embodiment has: a multilayer body 2, 2L (element body) formed of dielectric ceramic; a plurality of internal electrodes 4 (4a, 4b) disposed inside the multilayer body 2, 2L (element body) such that the internal electrodes are stacked with ceramics layers sandwiched therebetween; and a pair of terminal electrodes 3A and 3B provided on an outer face of the multilayer body 2, 2L (element body) and connected to the internal electrodes 4 (4a, 4b).

In the multilayer capacitor CD, a capacitor area CA that includes the plurality of internal electrodes 4 (4a, 4b), and a first suppression area EA and a second suppression area DA that serve as a suppression area for reducing electrostriction caused by the plurality of internal electrodes 4 (4a, 4b) and thereby suppressing noise, are formed. At least part of the suppression area, i.e., the first suppression area EA, is adjacent to the capacitor area CA, and the suppression area, especially the second suppression area DA, has a thickness determined according to the arrangement of the plurality of internal electrodes 4 (4a, 4b).

By forming the first suppression area EA adjacent to the capacitor area CA, electrostriction, caused by the plurality of internal electrodes 4 (4a, 4b) included in the capacitor area CA, can be reduced and noise can consequently be suppressed. Since the first suppression area EA, which is part of the suppression area, is adjacent to the capacitor area CA, and since the thickness of the suppression area, especially the thickness of the second suppression area DA, such thickness being a factor ensuring the ability of the suppression area to reduce electrostriction, is determined according to the arrangement of the internal electrodes 4 (4a, 4b), the suppression area can be formed depending on a given design of the capacitor area CA. Accordingly, the multilayer capacitor CD can effectively suppress electrostrictive vibration, with the suppression area applicable even in the case where a capacitor area CA of a given general-purpose design is included, and without constraint on its constituent material.

In the present embodiment, a marking 20 for indicating the position of the capacitor area CA relative to the multilayer body 2, 2L (element body) is provided on the first principal surface 2a or the second principal surface 2b of the multilayer body 2, 2L (element body). By making the marking 20 that indicates the position of the capacitor area CA relative to the multilayer body 2, 2L (element body) on the first principal surface 2a or the second principal surface 2b, the position of the capacitor area CA can be identified with accuracy. Accordingly, an arrangement which does not easily transmit electrostrictive vibration can be selected according to the relationship between the second suppression area DA and the capacitor area CA.

In the present embodiment, the multilayer body 2, 2L (element body) is configured to have a height size greater than its width size. By ensuring that the height size of the multilayer body 2, 2L (element body) is greater than the width size thereof, an area of sufficient thickness can be ensured on the mounting surface side (the second principal surface 2b side) when seen from the capacitor area CA. Accordingly, the second suppression area DA, which is part of the suppression area, can be disposed on the mounting surface side relative to the capacitor area CA, which can further ensure that the transmission of electrostrictive vibration to the mounting surface side is suppressed.

In the present embodiment, the marking internal electrodes 5 are wired out to only one outer surface and the marking 20 is formed only on the one outer surface. By forming the marking 20 on a single surface, the stacking direction of the internal electrodes 4 (4a, 4b) and the mounting direction can be understood from the relative positions with respect to that single surface. For example, in FIG. 1, the marking 20 is formed on the first principal surface 2a which is opposite to the second principal surface 2b serving as a mounting surface, and accordingly, one can understand that the capacitor should be mounted with the marking 20 facing up.

In the present embodiment, the marking 20 is formed by wiring out the marking internal electrodes 5 to the first principal surface 2a, 2b in which the paired terminal electrodes 3A and 3B are not formed. When the height size in the z-direction of the multilayer body is greater than the width size in the y-direction, the multilayer body can be identified as having a vertical electrode structure if the marking 20 is formed on either the principal surface 2a or 2b as in the present embodiment.

On the other hand, if the marking is formed on the side face 2c, 2d, the multilayer body can be identified as having a horizontal electrode structure. Such horizontal electrode type will be described below as a second embodiment.

Figure 7:
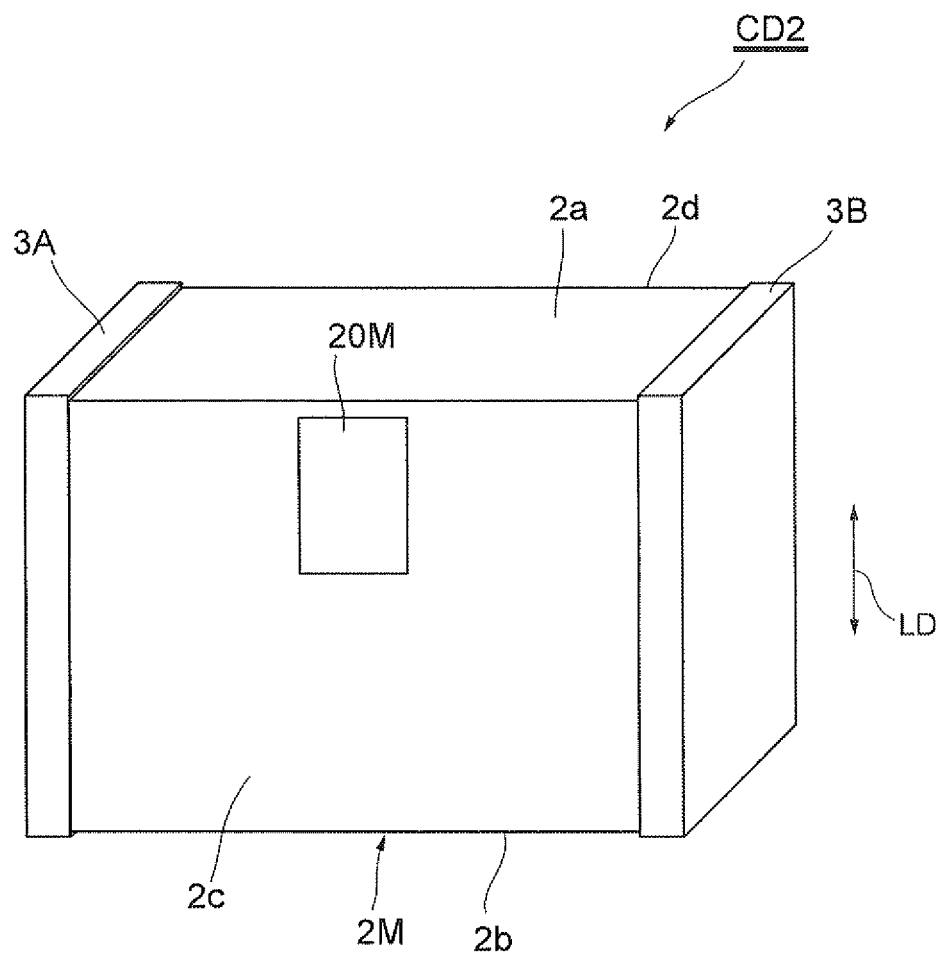
FIG. 7 is a perspective view schematically illustrating the appearance of a multilayer capacitor according to a second embodiment of the invention.

Referring to FIG. 7, a multilayer capacitor according to a second embodiment of the invention will be described. FIG. 7 is a perspective view schematically illustrating the appearance of a multilayer capacitor CD2 according to the second embodiment of the invention.

The multilayer capacitor CD2 has a multilayer body 2M and a pair of terminal electrodes 3A and 3B. The multilayer body 2M is in an approximately rectangular parallelepiped shape and has a first principal surface 2a, a second principal surface 2b, a first side face 2c, a second side face 2d, a first end face 2e (not specified in FIG. 1) and a second end face 2f (not specified in FIG. 1).

The terminal electrodes 3A and 3B are formed on the outer surface of the multilayer body 2M. More specifically, the terminal electrode 3A is formed so as to cover the first end face 2e (not specified in FIG. 7) and the terminal electrode 3B is formed so as to cover the second end face 2f (not specified in FIG. 7).

FIG. 8 illustrates the multilayer capacitor CD2 from which the terminal electrodes 3A and 3B have been removed. As illustrated in FIG. 8, the multilayer body 2M has the first principal surface 2a, the second principal surface 2b, the first side face 2c, the second side face 2d, the first end face 2e and the second end face 2f.

The multilayer body 2M has a plurality of internal electrodes 4M. The multilayer body 2M also has marking internal electrodes 5M. The multilayer body 2M is formed by stacking multiple ceramic green sheets, each having an internal electrode 4M and a marking internal electrode 5M formed therein, in a stacking direction LD and firing the stacked sheets.

Figure 9A:
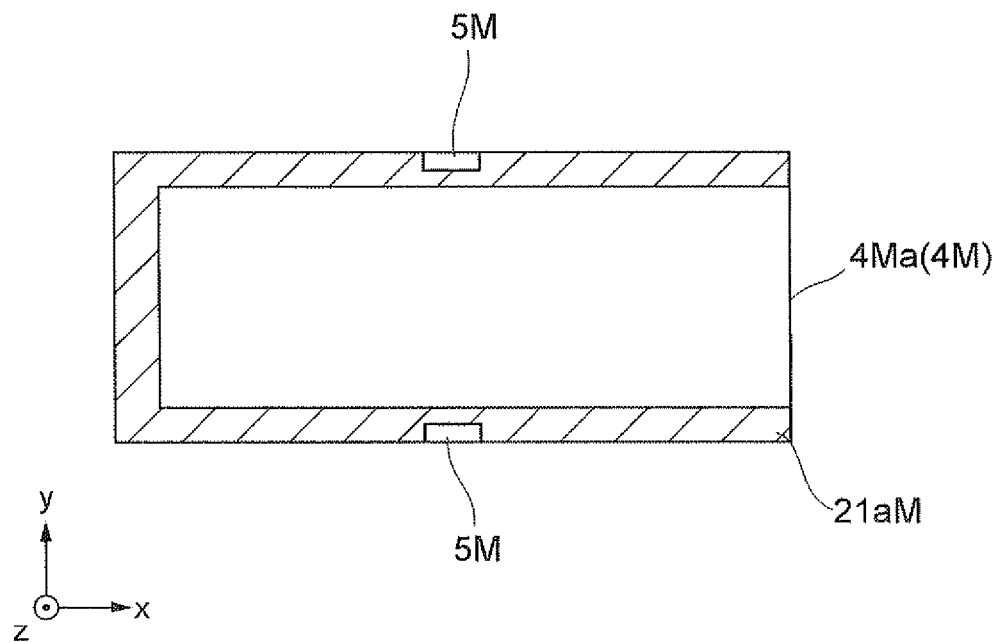
FIGS. 9A and 9B are illustrations showing the state of internal electrodes of the multilayer capacitor shown in FIG. 7.
Figure 9B:
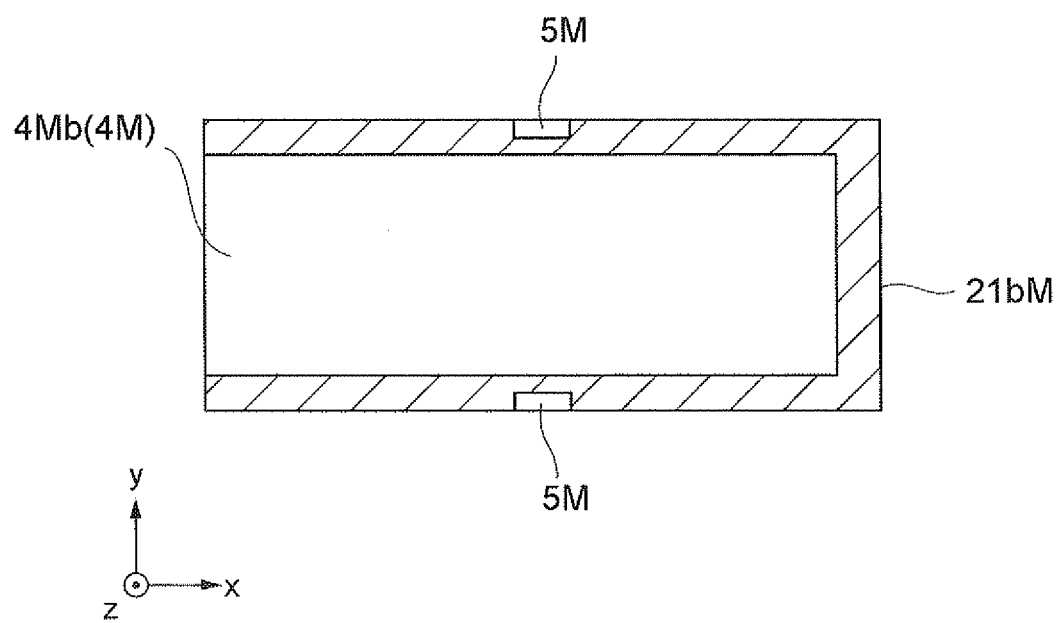

FIGS. 9A and 9B show the arrangement of the internal electrodes 4M and the marking internal electrodes 5M in the multilayer body 2M. FIG. 9A illustrates a layer in which an internal electrode 4Ma(4M), which is to be connected to the terminal electrode 3B, is formed, and FIG. 9B illustrates a layer in which an internal electrode 4Mb(4M), which is to be connected to the terminal electrode 3A, is formed.

As shown in FIG. 9A, a ceramic layer 21aM has an internal electrode 4Ma(4M) and a marking internal electrode 5M formed therein, and, as shown in FIG. 9B, a ceramic layer 21bM has an internal electrode 4Mb(4) and a marking internal electrode 5M formed therein. The multilayer body 2M is formed by alternately stacking the ceramic layers 21aM and 21bM.

In the multilayer body 2M formed by alternately stacking the ceramic layers 21aM and 21bM (see FIG. 8), the terminal electrode 3B is formed so as to be connected to the internal electrodes 4Ma (see FIG. 9A) and the terminal electrode 3A is formed so as to be connected to the internal electrodes 4Mb (see FIG. 6). The terminal electrodes 3A and 3B are formed, for example, through an immersion method such as dipping, a printing method such as screen-printing, or through both an immersion method and a printing method, with conductive paste which contains, as a major component thereof, silver, copper or nickel.

Further, a marking 20M (see FIG. 1) is formed on the first side face 2c and the second side face 2d to be connected to the marking internal electrodes 5M (see FIGS. 8, 9A and 9B) through plating. The marking 20M is formed so as to identify the top and bottom of the multilayer capacitor CD2, which has vertical (z-direction) directivity.

In the multilayer capacitor CD2 of this embodiment, the internal electrodes 4M are disposed closer to the first principal surface 2a than to the second principal surface 2b, and by treating the second principal surface 2b as a mounting surface through which the multilayer capacitor CD2 is to be mounted onto a mounting target surface of a circuit board, the multilayer capacitor CD2 can be configured such that the internal electrodes 4 are distant from the mounting surface and electrostrictive vibration occurring in the internal electrodes 4M diminishes before it is transmitted to the circuit board. The marking 20M is utilized to properly mount the multilayer capacitor CD2 having such directivity.

Figure 10:
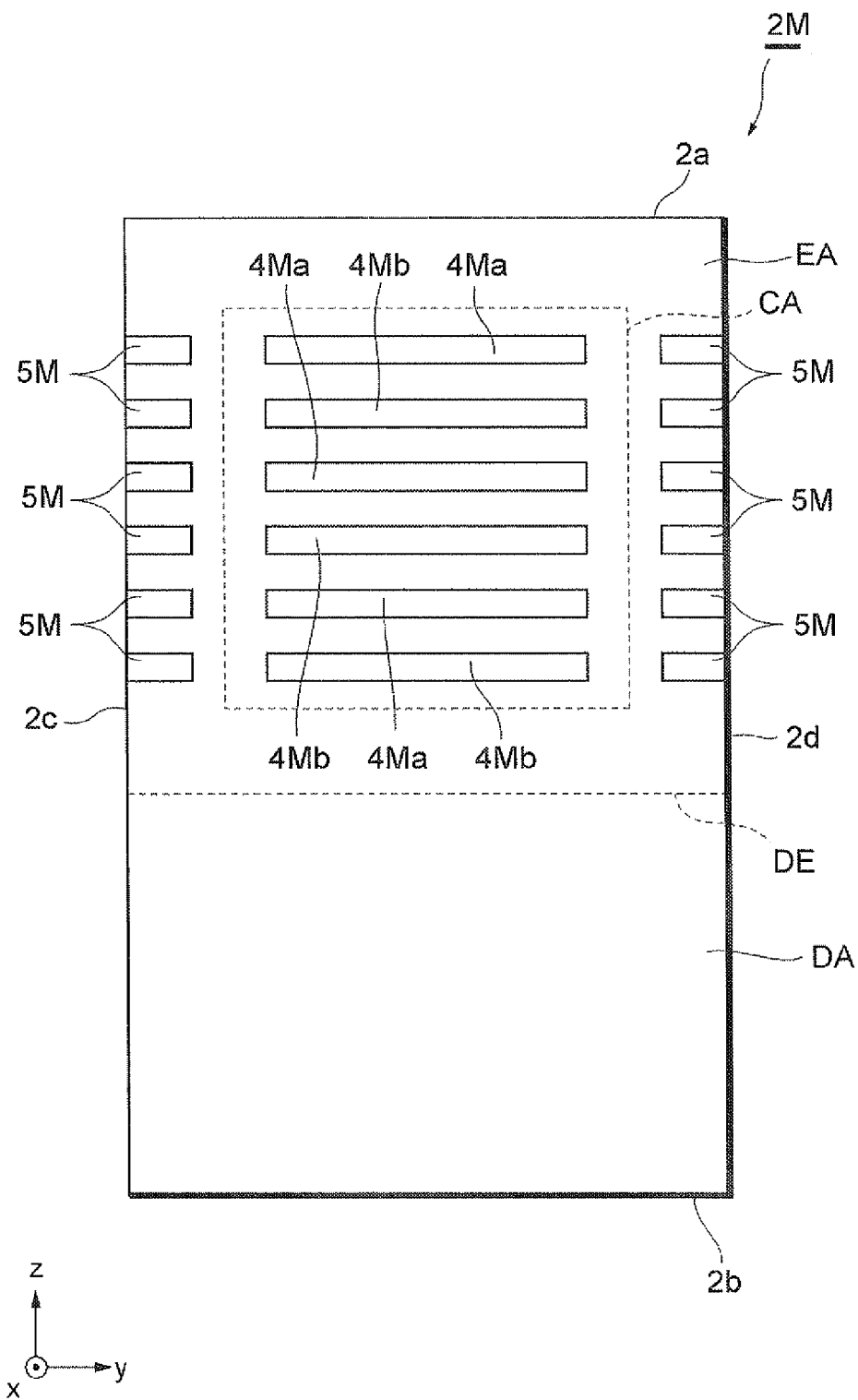
FIG. 10 is a cross-sectional view of the multilayer capacitor shown in FIG. 8 along the line II-II.

Referring next to FIG. 10, a configuration for diminishing the electrostrictive vibration occurring in the internal electrodes 4M will be described. FIG. 10 is a cross-sectional view of FIG. 8 along the line II-II. As illustrated in FIG. 10, the multilayer body 2M has a capacitor area CA which includes the internal electrodes 4Ma and 4Mb, a first suppression area EA (first area, suppression area), and a second suppression area DA (second area, suppression area).

The multilayer body 2M is configured such that the element body thereof has a height size greater than its width size. The suppression area is configured to include the first suppression area EA that surrounds the capacitor area CA and the second suppression area DA that is adjacent to only one side DE of the first suppression area EA.

In this embodiment, the marking internal electrodes 5M are wired out to only the first side face 2c and the second side face 2d at portions distant from the second suppression area DA when seen from the capacitor area CA. The marking internal electrodes 5M are wired out to the first and second side faces 2c and 2d of the multilayer body 2M (element body) only at the portions distant from the second suppression area DA when seen from the capacitor area CA, thereby forming a marking. Since the marking 20M is formed on the first side face 2c and the second side face 2d at the portions close to the first principal surface 2a, one can understand, even after the terminal electrodes 3A and 3B have been formed, that the second suppression area is formed on the second principal surface 2b side, and that the second principal surface 2b should be treated as a mounting surface. In addition, the multilayer body whose height size in the z-direction is greater than its width size in the y-direction, as in this embodiment, can be identified as having a horizontal electrode structure if a marking is formed on the first side face 2c and the second side face 2d of the multilayer body.

In the above-described first and second embodiments, the marking internal electrodes 5, 5M are disposed in the first suppression area EA and the second suppression area DA. Meanwhile, it is preferable that vibration suppression internal electrodes are disposed so as to further contribute to the suppression of electrostrictive vibration. In particular, arranging such vibration suppression internal electrodes in the second suppression area DA is an effective way to prevent electrostrictive vibration from being transmitted to the second principal surface 2b side, i.e., the mounting surface side.

Figure 11A:
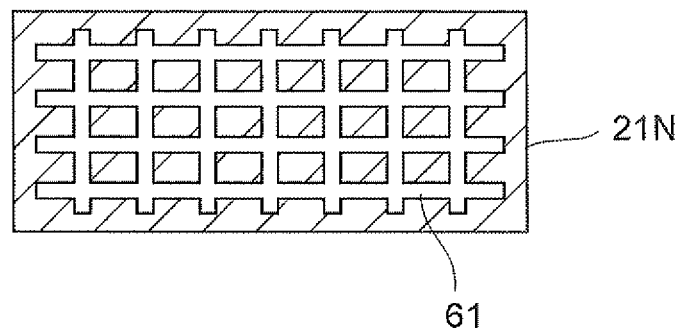
FIGS. 11A-11C are illustrations showing modifications of internal electrodes.
Figure 11B:
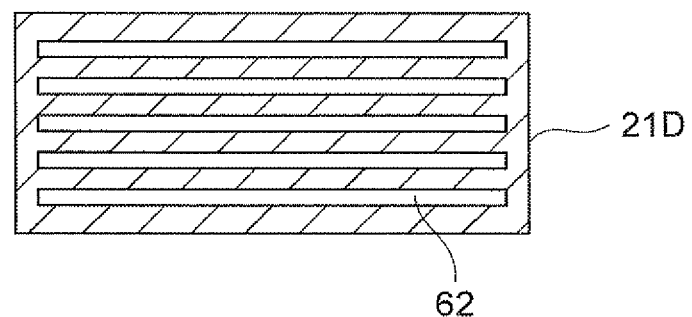
Figure 11C:
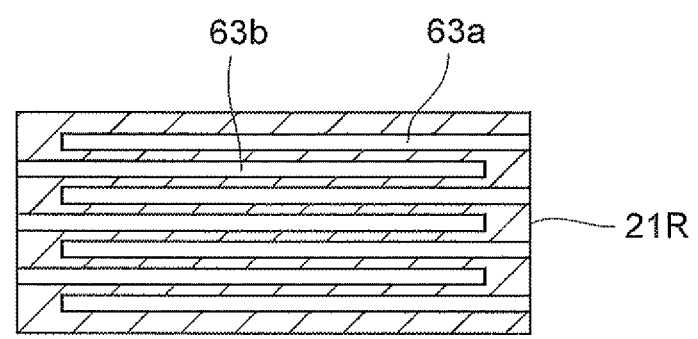

FIGS. 11A to 11C show possible arrangement patterns of the vibration suppression internal electrodes in the second suppression area DA. In an example shown in FIG. 11A, a grid-like pattern of vibration suppression internal electrode 61 is disposed in a ceramic layer 21N. In an example shown in FIG. 11B, a stripe pattern of vibration suppression internal electrode 62 is disposed in a ceramic layer 21P.

Although the vibration suppression internal electrodes are not connected to the terminal electrodes 3A and 3B in the examples shown in FIGS. 11A and 11B, it is preferable that the vibration suppression internal electrodes are connected to the terminal electrodes 3A and 3B. In an example shown in FIG. 11C, vibration suppression internal electrodes 63a and 63b, to be connected respectively to the terminal electrodes 3B and 3A having opposite polarity to each other, are disposed in one ceramic layer 21R.

It is preferable that at least one pair of vibration suppression internal electrodes 63a and 63b is provided in the same plane and that the paired vibration suppression internal electrodes 63a and 63b are connected to the terminal electrodes 3A and 3B having opposite polarity to each other. With this configuration, the direction of electrostrictive vibration caused by the paired vibration suppression internal electrodes 63a and 63b and the direction of electrostrictive vibration caused by the internal electrodes serving as the main electrodes (e.g., 4a and 4b, 4Ma and 4Mb) intersect (at approximately 90 degrees) with each other, resulting in the reduction of electrostrictive vibration.

Further, when the second suppression area DA is constituted by the vibration suppression internal electrodes 61, 62, 63a, 63b, which are plate-like electrodes made of metal, and by a ceramic portion, the vibration suppression internal electrodes 61, 62, 63a, 63b are covered by the ceramic portion and the thickness of the second suppression area DA, which is located adjacent to the capacitor area CA, can be determined according to the arrangement of the vibration suppression internal electrodes 61, 62, 63a, 63b.

In the above-described preferable configuration, when determining the thickness of the second suppression area DA, the level of contribution of the vibration suppression internal electrodes 61, 62, 63a, 63b to the suppression of electrostrictive vibration is taken into consideration as a vibration suppression internal electrode contribution factor and, as a result, electrostrictive vibration can be suppressed in a more suitable manner.

The vibration suppression internal electrodes 61, 62, 63a, 63b are formed in the second suppression area DA through stacking in the same direction as that of the internal electrodes 4. Since the vibration suppression internal electrodes 61, 62, 63a, 63b are formed in the second suppression area DA that is adjacent to the first suppression area EA surrounding the capacitor area CA, through stacking in the same direction as that of the internal electrodes 4, the vibration suppression internal electrodes 61, 62, 63a, 63b can be formed in the same processes as those of the other internal electrodes.

It is preferable that the second suppression area DA is formed to be adjacent to only one side of the first suppression area EA. When the second suppression area DA is formed to be adjacent to only one side of the first suppression area EA, the effect of suppressing electrostrictive vibration can be focused on the one side.

It is also preferable that the vibration suppression internal electrodes are formed outside of the internal electrodes 4 in the first suppression area EA. Since the vibration suppression internal electrodes are formed in the first suppression area EA that surrounds the capacitor area CA, they can suppress vibration in the first suppression area EA, in other words, in close proximity to the capacitor area CA which is the source of electrostrictive vibration. Examples of such arrangement include one in which the marking internal electrodes 5, 5M are disposed in the first suppression area EA to also serve as the vibration suppression internal electrodes.

Next, details of determining the thickness of the second suppression area DA according to the arrangement of the internal electrodes will be described. In order to facilitate understanding of the description, the below description will be made regarding the multilayer body 2M of the second embodiment, with reference to FIGS. 12 and 13, which are illustrations explaining the composition ratio of the vibration suppression area in the multilayer capacitor according to the above embodiment.

Figure 12:
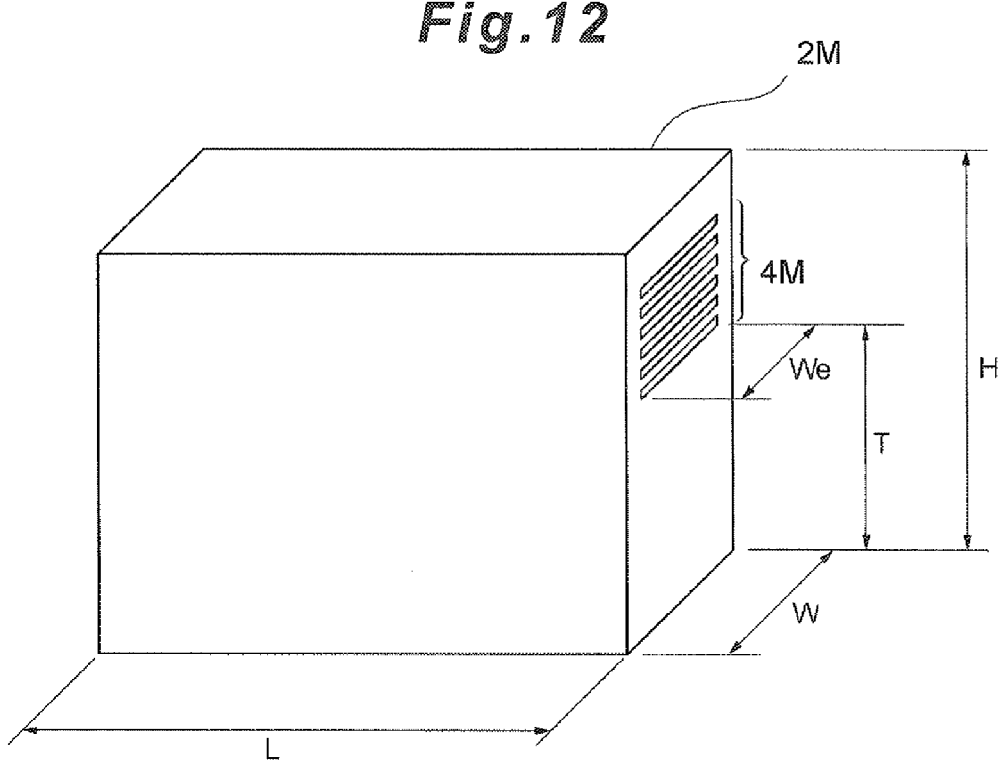
FIG. 12 is an illustration explaining the composition ratio of a vibration suppression area in a multilayer capacitor according to the above embodiment.
Figure 13:
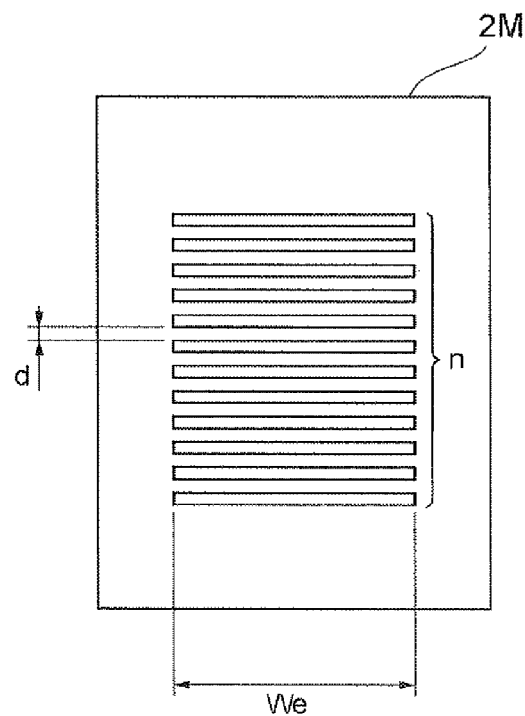
FIG. 13 is an illustration explaining the composition ratio of a vibration suppression area in a multilayer capacitor according to the above embodiment.

As illustrated in FIG. 12, H, W and L respectively represent the height, width and depth of the multilayer body 2M (element body). T represents the thickness of the second suppression area DA and We represents the width of the internal electrodes 4M. Further, as illustrated in FIG. 13, d represents the distance between the internal electrodes 4M and n represents the number of stacked internal electrodes 4M.

The thickness T of the second suppression area DA is determined so that the relationships specified in the following formulae (1), (2) and (3) are satisfied:

$$\alpha/\beta \leq 650 \qquad (1);$$

$$\alpha = We*n/d \qquad (2); \text{ and}$$

$$\beta = T/W \qquad (3).$$

The present inventor has found the value $\alpha$ obtained from We, n and d, to be a parameter increasing electrostrictive vibration, and also found the value $\beta$ obtained from T and W, to be a parameter decreasing electrostrictive vibration. As a result of examination, the present inventor has found that if $\alpha/\beta$ is not greater than 650, a sound pressure of 10 dB or less can be obtained.

In order to demonstrate that electrostrictive vibration can be significantly suppressed if the above relationships are satisfied, Examples 1-13 and Comparative Examples 1-8 were prepared as shown in Table 1 and the noise generated in each example was measured.

TABLE 1

| | L (mm) | W (mm) | H (mm) | d (um) | n | We (mm) | T (mm) | α | β | α/β | Sound pressure (dB) |
|---|---|---|---|---|---|---|---|---|---|---|---|
| Example 1 | 3.2 | 1.6 | 2.4 | 3.0 | 360 | 1.35 | 0.4 | 162.0 | 0.25 | 648 | 10 |
| Example 2 | 3.2 | 1.6 | 2.4 | 3.0 | 360 | 1.35 | 0.6 | 162.0 | 0.38 | 432 | 9 |
| Example 3 | 3.2 | 1.6 | 2.4 | 3.0 | 360 | 1.35 | 0.6 | 162.0 | 0.38 | 432 | 9 |
| Example 4 | 3.2 | 1.6 | 2.4 | 3.0 | 360 | 0.95 | 0.4 | 114.0 | 0.25 | 456 | 8 |
| Example 5 | 3.2 | 1.6 | 2.4 | 3.0 | 200 | 0.95 | 0.4 | 63.3 | 0.25 | 253 | 8 |
| Example 6 | 3.2 | 1.6 | 2.4 | 3.0 | 200 | 1.35 | 0.4 | 90.0 | 0.25 | 360 | 8 |
| Example 7 | 3.2 | 1.6 | 2.4 | 2.0 | 360 | 1.35 | 0.6 | 243.0 | 0.38 | 648 | 9 |
| Example 8 | 3.2 | 1.6 | 2.4 | 4.5 | 360 | 1.35 | 0.4 | 108.0 | 0.25 | 432 | 8 |
| Example 9 | 2.0 | 1.2 | 1.6 | 2.5 | 330 | 0.95 | 0.35 | 125.4 | 0.29 | 430 | 8 |
| Example 10 | 2.0 | 1.2 | 1.6 | 2.5 | 150 | 0.95 | 0.15 | 57.0 | 0.13 | 456 | 9 |
| Example 11 | 2.0 | 1.2 | 1.6 | 2.5 | 150 | 0.95 | 0.35 | 57.0 | 0.29 | 195 | 7 |
| Example 12 | 2.0 | 1.2 | 1.6 | 2.5 | 330 | 0.7 | 0.35 | 92.4 | 0.29 | 317 | 8 |
| Example 13 | 2.0 | 1.2 | 1.6 | 1.9 | 330 | 0.7 | 0.35 | 121.6 | 0.29 | 417 | 8 |
| Comparative Example 1 | 3.2 | 1.6 | 2.4 | 3.0 | 360 | 1.35 | 0.2 | 162.0 | 0.13 | 1296 | 31 |
| Comparative Example 2 | 3.2 | 1.6 | 2.4 | 3.0 | 360 | 0.95 | 0.2 | 114.0 | 0.13 | 912 | 28 |
| Comparative Example 3 | 3.2 | 1.6 | 2.4 | 3.0 | 200 | 1.35 | 0.2 | 90.0 | 0.13 | 720 | 18 |
| Comparative Example 4 | 3.2 | 1.6 | 2.4 | 2.0 | 360 | 1.35 | 0.4 | 243.0 | 0.25 | 972 | 27 |
| Comparative Example 5 | 3.2 | 1.6 | 2.4 | 4.5 | 360 | 1.35 | 0.2 | 108.0 | 0.13 | 864 | 25 |
| Comparative Example 6 | 2.0 | 1.2 | 1.6 | 2.5 | 330 | 0.95 | 0.15 | 125.4 | 0.13 | 1003 | 28 |
| Comparative Example 7 | 2.0 | 1.2 | 1.6 | 2.5 | 330 | 0.7 | 0.15 | 92.4 | 0.13 | 739 | 19 |
| Comparative Example 8 | 2.0 | 1.2 | 1.6 | 1.9 | 330 | 0.7 | 0.15 | 121.6 | 0.13 | 973 | 29 |

As can be seen from Table 1, if $\alpha/\beta$ is not greater than 650, the noise has a sound pressure of 10 dB or less, which means electrostrictive vibration can be suppressed and noise can consequently be suppressed.

In the case where the vibration suppression internal electrodes are disposed in the second suppression area DA, their contribution is taken into consideration as a vibration suppression internal electrode contribution factor p, and the thickness T of the second suppression area DA is determined so that the relationships specified by the following formulae (4), (5) and (6) are satisfied:

$$\alpha/\beta' \leq 650 \qquad (4);$$

$$\alpha = We*n/d \qquad (5); \text{ and}$$

$$\beta' = T/W*p \qquad (6).$$

In other words, even in the case where $\alpha/\beta$ exceeds 650 without taking into consideration the effects expected to be obtained from the vibration suppression internal electrodes, electrostrictive vibration can be significantly suppressed by arranging the vibration suppression internal electrodes in the second suppression area DA. In order to demonstrate that electrostrictive vibration can be significantly suppressed if the above-mentioned relationships are satisfied, Examples 14-16 and Comparative Examples 9-12 were prepared as shown in Table 2, and the noise generated in each example was measured. The electrode cover rate A, shown in Table 2, is the ratio of the area of the electrodes to the area of each layer illustrated in FIGS. 11A to 11C (each layer area corresponds to a value of (L in FIG. 12)×(W in FIG. 12)). The number of electrode layers B in Table 2 is the number of layers stacked in each example illustrated in FIGS. 11A to 11C. When noting the value AB ((electrode cover rate A)×(number of electrode layers B)), if AB exceeds 4, and preferably exceeds 5, electrostrictive vibration can be significantly suppressed even if α/β exceeds 650 and reaches 720 without the effect expected to be obtained from the vibration suppression internal electrodes.

Since, as described before, β is a parameter decreasing electrostrictive vibration, the vibration suppression internal electrode contribution factor p is determined as p=720/650=1.108, to correct the value β in the direction of suppressing electrostrictive vibration.

DESCRIPTION OF REFERENCE NUMERALS

2: multilayer body
2L: multilayer body
2M: multilayer body
2a: first principal surface
2b: second principal surface
2c: first side face
2d: second side face
2e: first end face
2f: second end face
3A: terminal electrode
3B: terminal electrode
4: internal electrode
4M: internal electrode
4Ma: internal electrode
4Mb: internal electrode

TABLE 2

| | Electrode cover rate A | Number of electrode layers B | AB | L (mm) | W (mm) | H (mm) | d (um) | n | We (mm) | T (mm) | α | β | α/β | Sound pressure (dB) |
|---|---|---|---|---|---|---|---|---|---|---|---|---|---|---|
| Example 14 | 0.48 | 12 | 5.76 | 3.2 | 1.6 | 2.4 | 3.0 | 200 | 1.35 | 0.2 | 90.0 | 0.13 | 720 | 9 |
| Example 15 | 0.28 | 25 | 7 | 3.2 | 1.6 | 2.4 | 3.0 | 200 | 1.35 | 0.2 | 90.0 | 0.13 | 720 | 8 |
| Example 16 | 0.48 | 25 | 12 | 3.2 | 1.6 | 2.4 | 3.0 | 200 | 1.35 | 0.2 | 90.0 | 0.13 | 720 | 7 |
| Comparative Example 9 | 0 | 0 | 0 | 3.2 | 1.6 | 2.4 | 3.0 | 200 | 1.35 | 0.2 | 90.0 | 0.13 | 720 | 18 |
| Comparative Example 10 | 0.15 | 12 | 1.8 | 3.2 | 1.6 | 2.4 | 3.0 | 200 | 1.35 | 0.2 | 90.0 | 0.13 | 720 | 17 |
| Comparative Example 11 | 0.15 | 25 | 3.75 | 3.2 | 1.6 | 2.4 | 3.0 | 200 | 1.35 | 0.2 | 90.0 | 0.13 | 720 | 15 |
| Comparative Example 12 | 0.28 | 12 | 3.36 | 3.2 | 1.6 | 2.4 | 2.0 | 360 | 1.35 | 0.2 | 90.0 | 0.13 | 720 | 16 |

Since, as described above, electrostrictive vibration can be significantly suppressed by arranging the vibration suppression internal electrodes in the second suppression area DA, further suppression of electrostrictive vibration is possible by arranging such vibration suppression internal electrodes in the case where α/β does not exceed 650 without the effect expected to be obtained from the vibration suppression internal electrodes. Table 3 shows examples of arranging the vibration suppression internal electrodes in the second suppression area DA in the case where α/β does not exceed 650 without the effect expected to be obtained from the vibration suppression internal electrodes.

4a: internal electrode
4b: internal electrode
5: marking internal electrode
5M: marking internal electrode
20: marking
20M: marking
21N: ceramic layer
21P: ceramic layer
21R: ceramic layer
21a: ceramic layer
21aM: ceramic layer
21b: ceramic layer

TABLE 3

| | Vibration suppression electrode cover rate A | Number of vibration suppression electrode layers B | AB | L (mm) | W (mm) | H (mm) | d (um) | n | We (mm) | T (mm) | α | β | α/β | Sound pressure (dB) |
|---|---|---|---|---|---|---|---|---|---|---|---|---|---|---|
| Example 17 | 0.48 | 12 | 5.76 | 3.2 | 1.6 | 2.4 | 3.0 | 360 | 1.35 | 0.4 | 162.0 | 0.25 | 648 | 6 |
| Example 18 | 0.48 | 25 | 12 | 3.2 | 1.6 | 2.4 | 3.0 | 360 | 1.35 | 0.4 | 162.0 | 0.25 | 648 | 4 |
| Example 19 | 0.15 | 25 | 3.75 | 3.2 | 1.6 | 2.4 | 3.0 | 360 | 1.35 | 0.4 | 162.0 | 0.25 | 648 | 8 |
| Comparative Example 13 | 0 | 0 | 0 | 3.2 | 1.6 | 2.4 | 3.0 | 360 | 1.35 | 0.4 | 162.0 | 0.25 | 648 | 10 |
| Comparative Example 14 | 0.15 | 12 | 1.8 | 3.2 | 1.6 | 2.4 | 3.0 | 360 | 1.35 | 0.4 | 162.0 | 0.25 | 648 | 10 |

As can be seen from Table 3, in the examples where α/β was the same value of 648, sound pressure decreased if the percentage of the vibration suppression internal electrodes increased. A comparison of Examples 17-19 and Comparative Examples 13-14 shows that AB, which represents the percentage of the vibration suppression internal electrodes, is preferably equal to or greater than 3.

21bM: ceramic layer
61: vibration suppression internal electrode
62: vibration suppression internal electrode
63a: vibration suppression internal electrode
63b: vibration suppression internal electrode
CA: capacitor area
CD: multilayer capacitor CD2: multilayer capacitor
DA: second suppression area
EA: first suppression area
LD: stacking direction

What is claimed is:

1. A multilayer capacitor comprising:
an element body formed of dielectric ceramic;
a plurality of internal electrodes disposed inside the element body such that the internal electrodes are stacked with ceramic layers sandwiched therebetween; and
a pair of terminal electrodes provided on an outer surface of the element body and connected to the internal electrodes,
wherein:
a capacitor area which includes the plurality of internal electrodes and a suppression area for reducing electrostriction caused by the plurality of internal electrodes to suppress noise are formed,
at least part of the suppression area is adjacent to the capacitor area,
a thickness of the suppression area is determined according to an arrangement of the plurality of internal electrodes, the thickness being determined to satisfy the following expressions:

$\alpha/\beta \leq 650$ $\alpha = We*n/d$ (We: electrode width, n: number of stacked electrodes, d: inter-electrode distance); and $\beta = T/W$ (T: suppression area thickness, W: element body width), a marking for indicating a position of the capacitor area relative to the element body is provided on the outer surface of the element body, and
the marking is formed by wiring out a plurality of marking internal electrodes to the outer surface at a portion where the paired terminal electrodes are not formed, the marking is integrated with ends of the plurality of marking internal electrodes exposed in the outer surface.

2. The multilayer capacitor according to claim 1, wherein the element body is configured to have a height size greater than a width size thereof.

3. The multilayer capacitor according to claim 2, wherein the marking internal electrode is wired out to only one side face of the outer surface and the marking is formed on only the one side face.

4. The multilayer capacitor according to claim 3, wherein:
the element body is configured to have a height size greater than a width size thereof;
the suppression area comprises a first area that surrounds the capacitor area and a second area that is adjacent to only one side of the first area; and
the marking internal electrode is wired out to only one surface of the outer surface, at a portion in the second area or at a portion opposite to the second area when seen from the capacitor area.

5. The multilayer capacitor according to claim 1, wherein:
the suppression area is composed of a ceramic portion and plate-like vibration suppression internal electrodes made of metal, the vibration suppression internal electrodes being covered by the ceramic portion; and
a thickness of the suppression area adjacent to the capacitor area is determined according to an arrangement of the vibration suppression internal electrodes, to satisfy the following expressions:

$\alpha/\beta' \leq 650$;

$\alpha = We*n/d$ (We: electrode width, n: number of stacked electrodes, d: inter-electrode distance); and $\beta' = T/W*p$ (p: vibration suppression internal electrode contribution factor, T: suppression area thickness, W: element body width).

6. The multilayer capacitor according to claim 5, wherein:
the suppression area comprises a first area that surrounds the capacitor area and a second area that is adjacent to the first area; and
the vibration suppression internal electrodes are formed outside of the internal electrodes in the first area.

7. The multilayer capacitor according to claim 5, wherein:
the suppression area comprises a first area that surrounds the capacitor area and a second area that is adjacent to the first area; and
the vibration suppression internal electrodes are formed in the second area such that the vibration suppression internal electrodes are stacked in the same direction as the internal electrodes.

8. The multilayer capacitor according to claim 6, wherein the second area is formed such that the second area is adjacent to only one side of the first area.

9. The multilayer capacitor according to claim 5, wherein:
at least one pair of the vibration suppression internal electrodes is provided in the same plane; and
the paired vibration suppression internal electrodes are connected respectively to the terminal electrodes having opposite polarity to each other.

10. The multilayer capacitor according to claim 7, wherein the second area is formed such that the second area is adjacent to only one side of the first area.

* * * * *